United States Patent [19]

Bingham

[11] Patent Number: 4,907,085
[45] Date of Patent: Mar. 6, 1990

[54] TELEVISION SYSTEM USER-ACCESSIBLE COMPONENT DISPLAY APPARATUS

[75] Inventor: Joseph P. Bingham, Indianapolis, Ind.

[73] Assignee: Thomson Consumer Electronics, Inc., Indianapolis, Ind.

[21] Appl. No.: 247,804

[22] Filed: Sep. 22, 1988

[51] Int. Cl.⁴ .................. H04N 5/268; H04N 5/222; H04N 5/04

[52] U.S. Cl. .................................. 358/181; 358/185; 358/192.1; 340/712

[58] Field of Search ................. 358/181, 192.1, 185, 358/104; 364/495; 340/712; 341/23

[56] References Cited

U.S. PATENT DOCUMENTS

| | | | |
|---|---|---|---|
| 4,337,480 | 6/1982 | Bourassin et al. | 358/93 |
| 4,400,735 | 8/1983 | Strammello, Jr. | 358/181 |
| 4,495,497 | 1/1985 | Molnar | 340/825.63 |
| 4,514,764 | 4/1985 | Borg | 358/181 |
| 4,575,759 | 3/1986 | Griepentrog et al. | 358/181 |
| 4,581,644 | 4/1986 | Deiss | 358/181 |
| 4,581,645 | 4/1986 | Beyers, Jr. | 358/181 |
| 4,638,181 | 1/1987 | Deiss | 307/243 |
| 4,647,973 | 3/1987 | Deiss | 358/181 |
| 4,725,694 | 2/1988 | Fuer et al. | 340/712 |
| 4,763,117 | 8/1988 | Blattner et al. | 340/712 |
| 4,796,019 | 1/1989 | Auerbach | 340/712 |

OTHER PUBLICATIONS

"RCA The FKC 2600/2601 Monitor/Receivers Dimensia Training Manual," 1984, by RCA Consumer Electronics Technical Publications, Indianapolis, Indiana, pp. 4–10, 24–25, 30–33 and 40–43.

"CTC140 Color TV Chassis Technical Training Manual," 1987, by RCA Consumer Electronics Technical Publications, Indianapolis, Indiana, pp. 4–5 and 64–65.

"RCA Color Television Basic Service Data 1987 CTC140," by RCA Consumer Electronics Technical Publications, Indianapolis, Indiana, pp. 2–11.

Primary Examiner—John K. Peng
Attorney, Agent, or Firm—Joseph S. Tripoli; Peter M. Emanuel; Thomas F. Lenihan

[57] ABSTRACT

A graphic illustration of the rear connector panel of a television monitor/receiver is displayed on the screen of the monitor/receiver along with a menu of possible functions to which the connectors may be assigned. By making the functions of the connectors assignable, only a relatively few connectors need be provided, thereby producing a cost saving and reducing complexity for the user.

15 Claims, 4 Drawing Sheets

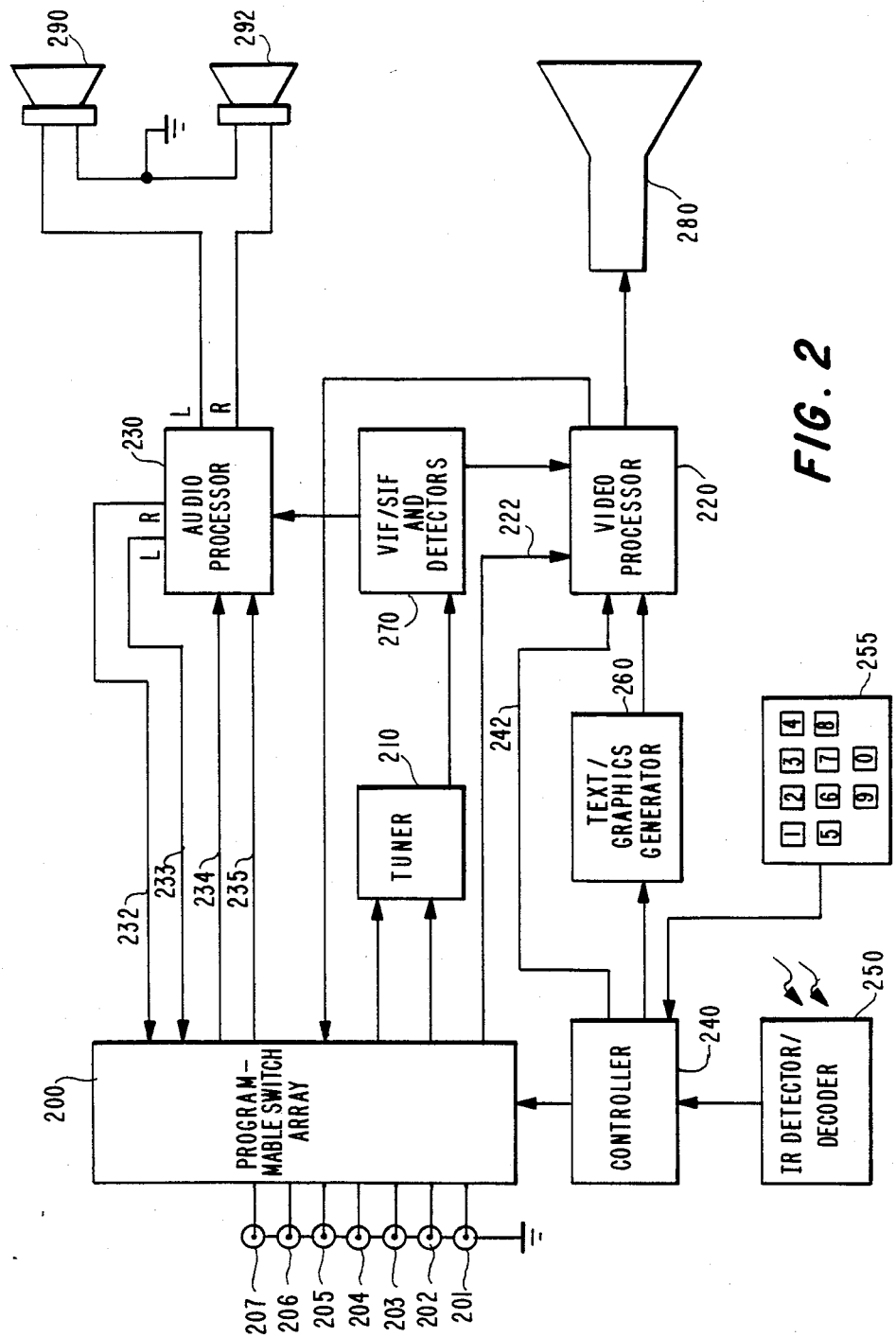

TELEVISION SYSTEM USER-ACCESSIBLE COMPONENT DISPLAY APPARATUS

FIELD OF THE INVENTION

This invention relates to the field of input/output connections for a televison system.

BACKGROUND OF THE INVENTION

A television monitor/receiver is a television component capable of receiving and processing both baseband and radio frequency (RF) television signals. That is, a television monitor/receiver includes all of the elements of a monitor and also includes an RF tuner. Modern video cassette recorders (VCRs) also receive and process both baseband video and RF television signals. While the invention is described primarily with regard to a television monitor/receiver embodiment, the scope of the invention is intended to include VCR's as well. A television monitor/receiver usually provides a panel on the rear of its cabinet upon which is mounted connectors for providing the monitor/receiver with at least RF input signals, video input signals and audio input signals. In addition to these basic signals, modern monitor/receivers may provide terminals, or "jacks", for receiving left and right stereo audio signals from, for example, a stereo audio equipped video cassette recorder (stereo VCR). (As used herein the terms "connector", "jack", and "terminal" have the same meaning and are used interchangeably.) A modern monitor/receiver may also provide audio output terminals from which audio signals may be connected to an external audio amplifier, or directly to external speakers. Monitor/receivers having as many as 20 connectors on their panel are commonly available.

Not all of the connectors of a monitor receiver will ordinarily be used at one time. The unused connectors represent an unnecessary expense, and a large number of connectors may tend to cause confusion among users.

Efforts have been made in the industry to alleviate the confusion among users resulting from a relatively large number of rear panel connectors. One such effort is the RCA Dimensia system of audio and video components employing an audio/video signal bus. In the Dimensia system, an internal switching network is used to select desired audio and video signals for connection to the audio/video bus from among those connected to the back panel. A monitor/receiver having rear panel jacks selected by such an internal switching network is the RCA CTC-140 television monitor/receiver. A complete description of the CTC-140 monitor-receiver is found in "1987 CTC 140 Color Television Basic Service Data", and in "CTC 140 Color TV Chassis Technical Training Manual", published by RCA Technical Publications, Indianapolis, Ind.

SUMMARY OF THE INVENTION

In accordance with the invention, the number of terminals on the connector panel can be reduced by providing an interconnection system which selectively connects one of a relatively small number of terminals to one of a number signal processing circuits internal to the monitor/receiver by using a controller to control a programmable switch array in accordance with selections made by a user from a menu of possible interconnections displayed on a display screen.

In accordance with another aspect of the invention, a graphic representation of the terminals may be displayed along with the menu of possible interconnections, as an aid to the user in identifying the terminals to be used.

In accordance with still another aspect of the invention it is herein recognized that a user can be familiarized with television system components including connectors which he may be required to locate and use, by displaying a pictorial representation of the user-accessible components on a display screen for the user's instruction. In this way, a particular configuration of components as displayed may be recognized and properly used.

BRIEF DESCRIPTION OF THE DRAWING

FIG. 2 shows in block diagram form apparatus useful in implementing the menu selection scheme of FIGS. 1a and 1b.

DETAILED DESCRIPTION OF THE DRAWING

Figure 1A:
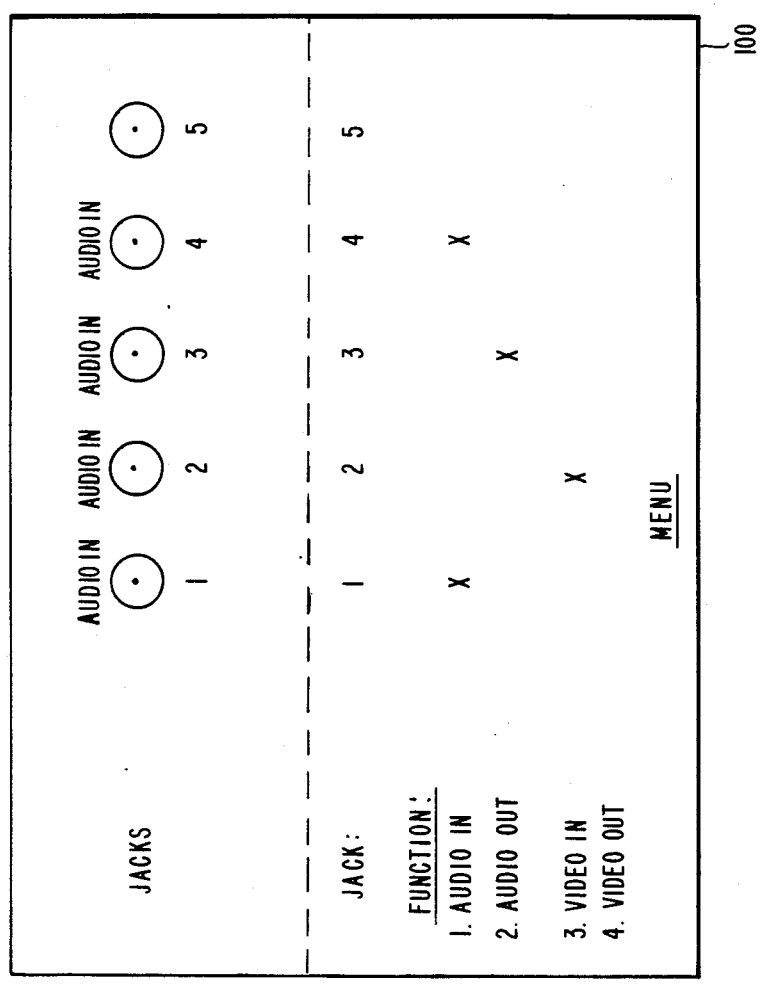
FIGS. 1a and 1b show a display screen displaying a representation of the connectors on a monitor/receiver or VCR connector panel, along with a menu of functions assignable to the connectors, in accordance with an aspect of the invention.
Figure 1B:
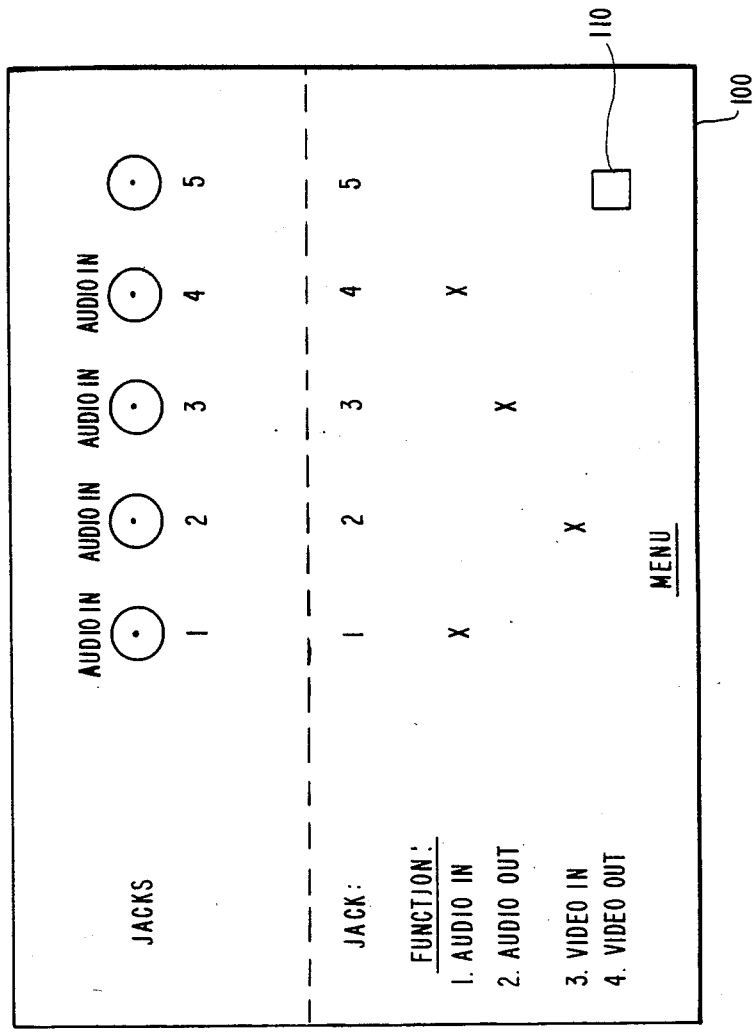

Referring to FIGS. 1a and 1b, a pictorial representation of coaxial connectors mounted on a television monitor/receiver rear panel and a menu of possible interconnections of an audio/video system is displayed on a display screen 100. Each of the jacks on the rear connector panel is a multifunction jack which can be used for connecting audio, or video, or (as will be explained below) RF signals. A user can assign the various functions, audio in, audio out, video in, video out to any of jacks 1 through 5 by selecting the proper function/jack combinations. This selection may be accomplished by entering, by means of a keyboard, the number corresponding to a desired selection from a menu comprising a numbered list of functions as shown in FIG. 1a, followed by the desired jack number. Alternatively, as shown in FIG. 1b, an X-axis-Y-axis cursor positioning control unit may be used to make the selection. The X's shown in FIGS. 1a and 1b indicate that jack 1 has been assigned to audio in, jack 2 has been assigned to video in, jack 3 has been assigned to audio out, and jack 4 has been assigned to an alternate audio in function. Note from FIGS. 1a and 1b that as each connector is assigned to a particular function and in response to the command signal generated when the user enters the assignment by means of a keyboard for the menu selection, or a cursor positioning control unit, a label indicating that function may also appear on the display adjacent to the pictorial representation of the connector. Accordingly, connector 5 has no label because no function has as yet been assigned to connector 5. The displayed labels associated with each connector advantageously serve to instruct the user as to the particular function to which each terminals has been assigned. In this way, the user can refer to the screen display as an aid in making the physical connections to the rear connector panel. Cursor 110 of FIG. 1b has been positioned to assign the video out function to jack 5, by means of a joystick or pointing function infrared (IR) remote control. A suitable pointing function IR remote control unit is known from U.S. Pat. No. 4,745,402 (Auerbach) issued May 17, 1988 and herein incorporated by reference. Another suitable pointing function IR remote control device is known from U.S. Pat. No. 4,796,019 (Auerbach) and also herein incorporated by reference. A suitable joystick type remote control unit is known from U.S. Pat. No. 4,313,227 (Eder) issued Jan. 26, 1982.

Figure 3:
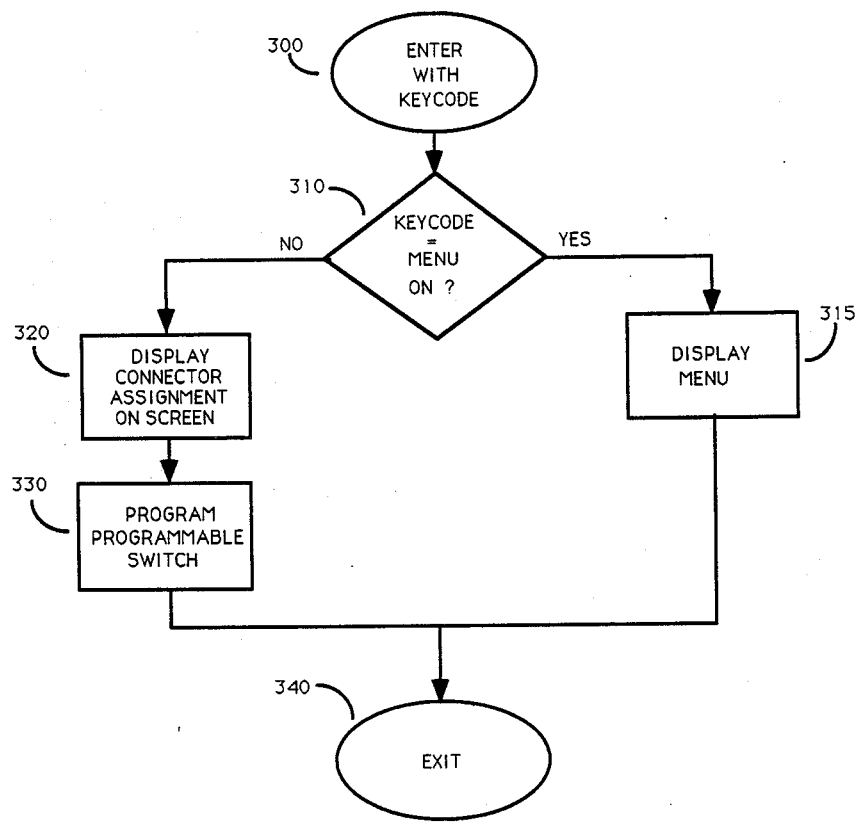
FIG. 3 is a flowchart showing a portion of the control program for the controller shown in FIG. 2

A television monitor/receiver including apparatus for implementing the switch menu selection scheme described so far with reference to FIGS. 1a and 1b is shown in FIG. 2. Although the display of FIGS. 1a and 1b showed only 5 jacks for simplicity, the circuitry of the embodiment of FIG. 2 accommodates 7 jacks to allow for left and right stereo audio in and out signals, and 2 radio frequency (RF) input signals. A programmable switch array 200 selectively connects ones of jacks 201–207 to internal signal processing unit such as a tuner 210, a video processor 220, and an audio processor 230. Programmable switch array 200 operates under control of a switch controller 240, which may be a microprocessor operating under stored program control. Referring also to FIG. 3, controller 240 controls programmable switch array 200 in accordance with user-entered commands generated by a remote control transmitter hand unit (not shown) which are received and decoded in IR detector/decoder 250. Alternatively, a user may enter commands for controlling controller 240 via a local keyboard 255 (step 300).

In order to program programmable switch 200, the user first "calls up" the menu for display by entering the appropriate command via the remote control handunit or via the local keyboard (step 310). If a remote control handunit is used, IR detector/decoder 250 receives, decodes, and passes the command to controller 240 which activates a text/graphics generator 260 and provides an indication to the video processor 220 via conductor 242, that the text/graphics signal produced by text/graphics generator 260, rather than the currently displayed video, should be displayed on the display screen of a picture tube 280 (step 315 and 340). As each selection is made by the user (step 320), controller 240 controls programmable switch array 200 to connect the proper terminal to the particular internal circuitry which would accomplish the desired function (step 330). For example, if the user assigns the Right Audio Out function to jack 7 (that is, jack 207 of FIG. 2) then controller 240 would control programmable switch array 200 to connect jack 207 to wire 232, thus coupling Right Audio signals to jack 207. In addition to providing stereo audio signals for connection to external components, audio Processor 230 may also provide left and right stereo audio signals to an internal pair of speakers 290 and 292, respectively. Audio processor 230 may also receive stereo signals from an external source via programmable switch array 200 and wires 234 and 235. Video signals may be provided from tuner 210 via video IF/sound IF and detector unit 270, or from an external video source via programmable switch array 200 and wire 222.

The individual switches of programmable switch array 200 may be, for example, switches of the type known from U.S. Pat. No. 4,514,764 (Borg et al.) issued Apr. 30, 1985, which discloses a switch arrangement suitable for coupling both RF and baseband video signals via the same terminal. For applications in which it is not necessary to switch RF signals via the programmable switch array 200, then a relatively low cost switch array may be constructed by utilizing switch elements as known from, for example, U.S. Pat. No. 4,638,181 (Deiss) issued Jan. 20, 1981.

The circuitry of FIG. 2 (with the exception of the speakers 290, 292 and picture tube 280) is also useful in a VCR. When used in a VCR system, the menu and graphic illustration of the connector panel of the VCR can be displayed on the screen of a television connected to the VCR.

It is further noted that even without including the switching array 200, it may be desirable in certain instances to display on a display screen a representation of user-accessible components, such as switches, controls and connectors, as an aid to the user in identifying and using the physical components on the rear panel. This familiarization of the user with the system components before he has to to physically locate and use them may tend to reduce confusion and the apprehension which some users feel when confronted with a multitude of unfamiliar switches, controls and connectors during system set-up.

What is claimed is:

1. Interconnection apparatus for use in a television system comprising:
   a plurality of externally accessible terminals for coupling signals between said television system and a plurality of external devices which may be connected thereto;
   a plurality of signal processing circuits internal to said television system for processing television signals, each of said signal processing circuits having an input and an output;
   switch means having a control input for receiving switching control signals, said switch means being coupled to said plurality of terminals and to at least one of said inputs and outputs of said plurality of signal processing circuits for selectively connecting ones of said terminals to ones of said plurality of signal processing circuits in response to said switching control signals;
   controller means coupled to said switch means for generating said switching control signal and applying said switching control signal to said control input of said switch means;
   display signal generator means coupled to said controller means for generating signals for displaying a list of functions from which a particular function may be selected and assigned to a specified one of said terminals by a user; and
   data entry means having an input for receiving data entered by said user, and having an output coupled to an input of said controller means;
   said controller means controlling said switch means to couple one of said signal processing circuits to one of said terminals in accordance with the assignment of said particular function to said specified one of said terminals by generating said switching control signals in response to said data entered by said user, said switching control signal defining which of said signal processing circuits is to be connected to which of said terminals by said switch means.

2. The apparatus of claim 1 wherein said controller is a microprocessor.

3. The apparatus of claim 2 wherein said data entered by said user is X-Y position data, and said data is entered via a remote control handunit.

4. The apparatus of claim 3 wherein said display signal comprises alphanumeric characters.

5. The apparatus of claim 4 wherein said display signal comprises both graphics signals and alphanumeric characters.

6. The apparatus of claim 5 wherein said graphics signals are representative of said terminals.

7. The apparatus of claim 6 further including display means responsive to said display signals.

8. The apparatus of claim 2 wherein said data entered by said user is entered via a keyboard by using the coordinates of the intersection of a desired function and a desired terminal.

9. The apparatus of claim 8 wherein said display signal comprises alphanumeric characters.

10. The apparatus of claim 9 wherein said display signal comprises both graphics signals and alphanumeric characters.

11. The apparatus of claim 10 wherein said graphics signals are representative of said terminals.

12. The apparatus of claim 11 further including means responsive to said display signals.

13. Interconnection system for use in a television system comprising:
   a plurality of externally accessible terminals for coupling signals between said television system and a plurality of external devices which may be connected thereto;
   a plurality of signal processing circuits internal to said television system for processing television signals;
   switch means having a control input for receiving switching control signals, said switch means being coupled to said plurality of terminals and to said plurality of signal processing circuits for selectively connecting ones of said terminals to ones of said plurality of signal processing circuits in response to said switching control signals;
   controller means coupled to said switch means for generating said switching control signal and applying said switching control signal to said control input of said switch means;
   display signal generator means coupled to said controller means for generating signals suitable for displaying a representation of said terminals and for displaying a list of functions from which a particular function may be selected and assigned to each of said terminals by a user; and
   data entry means having an input for receiving data entered by said user, and having an output coupled to an input of said controller means;
   said controller means generating said switching control signals in response to said data entered by said user, said switching control signal defining which of said signal processing circuits is to be connected to which of said terminals by said switch means.

14. The system of claim 13 wherein said display signal generator also generates an indicia of said selected function assigned to one of said terminals for display adjacent to said one of said terminals in response to the assignment of said function to said one of said terminals by a user, said display of said terminal and associated indicia of function thereby instructing said user as to the currently assigned function served by each of said externally accessible terminals.

15. A television system comprising:
   a panel having components mounted thereon, said components being accessible to a user;
   display signal generator means for generating signals suitable for displaying a graphic representation of said components in response to a control signal;
   control means coupled to said signal generator means for generating said control signal in response to control data entered by said user; and
   data entry means coupled to said control means for generating said control data when activated by said user.

* * * * *